(12) United States Patent
Ohta et al.

(10) Patent No.: US 11,895,063 B2
(45) Date of Patent: Feb. 6, 2024

(54) INTERACTIVE INPUT SUPPORT SYSTEM AND INTERACTIVE INPUT SUPPORT METHOD

(71) Applicant: KUZEN Inc., Tokyo (JP)

(72) Inventors: Shogo Ohta, Tokyo (JP); Kota Shirakura, Tokyo (JP)

(73) Assignee: KUZEN Inc., Tokyo (JP)

( * ) Notice: Subject to any disclaimer, the term of this patent is extended or adjusted under 35 U.S.C. 154(b) by 43 days.

(21) Appl. No.: 17/629,124

(22) PCT Filed: Jul. 23, 2020

(86) PCT No.: PCT/JP2020/028592
§ 371 (c)(1),
(2) Date: Jan. 21, 2022

(87) PCT Pub. No.: WO2021/015284
PCT Pub. Date: Jan. 28, 2021

(65) Prior Publication Data
US 2022/0303232 A1 Sep. 22, 2022

(30) Foreign Application Priority Data
Jul. 23, 2019 (JP) ................. 2019-135620

(51) Int. Cl.
*G06F 15/16* (2006.01)
*H04L 51/02* (2022.01)
(Continued)

(52) U.S. Cl.
CPC ............ *H04L 51/02* (2013.01); *G06F 3/0481* (2013.01); *G06F 40/205* (2020.01)

(58) Field of Classification Search
CPC ........ H04L 51/02; G06F 40/205; G06F 3/0481
(Continued)

(56) References Cited

U.S. PATENT DOCUMENTS 7,668,903 B2 * 2/2010 Edwards ................. H04L 67/51
709/224
10,839,432 B1 * 11/2020 Konig .................. G06Q 30/016
(Continued)

FOREIGN PATENT DOCUMENTS

| JP | 2009-199127 A | 9/2009 |
|---|---|---|
| JP | 6440571 B2 | 12/2018 |
| JP | 6489670 B2 | 3/2019 |

OTHER PUBLICATIONS

Japanese Office Action issued for the Japanese counterpart application (Application No. 2019-135620) dated Aug. 20, 2019.
(Continued)

*Primary Examiner* — Imad Hussain
(74) *Attorney, Agent, or Firm* — IP Business Solutions, LLC (57) ABSTRACT

An information processing system is a system using a chatbot to use the various network services such as SaaS and to allow the users to seamlessly enjoy each of the services. While performing an interactive mode with input entered by a user based on a predetermined scenario, the information processing system performs registering retrieving (browsing) and deleting information for enjoying the services, and various settings and supports for enjoying the services.

10 Claims, 6 Drawing Sheets

(51) Int. Cl.
  *G06F 40/205* (2020.01)
  *G06F 3/0481* (2022.01)
(58) Field of Classification Search
  USPC .......................................................... 709/206
  See application file for complete search history.

(56) References Cited

U.S. PATENT DOCUMENTS

| | | | |
|---|---|---|---|
| 2013/0066987 A1* | 3/2013 | Levinson | G06Q 10/10 709/206 |
| 2013/0311997 A1* | 11/2013 | Gruber | G06F 9/5005 718/102 |
| 2017/0310613 A1 | 10/2017 | Lalji et al. | |
| 2018/0332169 A1 | 11/2018 | Somech et al. | |
| 2019/0188590 A1 | 6/2019 | Wu et al. | |

OTHER PUBLICATIONS

International Search Report issued for the prior international application of this application (PCT/JP2020/028529) dated Aug. 18, 2020.
Written Opinion of the International Searching Authority issued for the prior international application of this application (PCT/JP2020/028529) dated Aug. 18, 2020.
Examination Report Issued for the counterpart Indian Patent Application No. 202217025237 dated Jan. 17, 2023.
Extended European Search Report issued for the counterpart EP patent application No. 20843080.1 dated Sep. 8, 2023.

* cited by examiner

| CHATBOT USER INFORMATION | | | SERVICE USER INFORMATION | | | | | | |
|---|---|---|---|---|---|---|---|---|---|
| USER ID | PASSWORD | TERMINAL ID | SERVICE ID 001 | | | SERVICE ID 002 | | | ... |
| | | | USER NAME | PASSWORD | OTHERS | USER NAME | PASSWORD | OTHERS | |
| SI001 | ***** | UID001 | | | | | | | |
| SI002 | ***** | UID011 | | | | | | | |
| ... | ... | ... | ... | ... | ... | ... | ... | ... | ... |

INTERACTIVE INPUT SUPPORT SYSTEM AND INTERACTIVE INPUT SUPPORT METHOD

TECHNICAL FIELD

The present invention relates to an interactive input support system and an interactive input support method.

BACKGROUND OF THE INVENTION

In recent years, services such as chat applications have been proposed that use robots called chatbots having the know-how of experts with a wealth of knowledge to answer inquiries from users based on interactive scenarios.

For example, systems that provide chatbot is controlled by scripts using programming languages, scripting languages, and the like.

In particular, recently, a system that has a plurality of chatbot servers is known wherein the plurality of chatbot servers that are set up for each specific field and provide a response to an inquiry of a user and the like, respectively. The system can provide highly accurate information to the users (for Example Japanese Patent No. 6489670).

On the other hand, in late years, with the spread of cloud computing (network computing), the SaaS (Software as a Service) has become popular. The SaaS is a service for using various software on network.

In particular, recently, the various network services provided by the SaaS are often provided in different data formats and data models. For this reason, the system to link these services is proposed (for example, Japanese Patent No. 6440571).

SUMMARY OF INVENTION

Problem to be Solved by the Invention

However, an autoresponder chat application (for example the chatbot) having a scenario with the system described above in Japanese Patent No. 6489670 can not select a target service from among the plurality of the network services (for example, the SaaS) based on the inquiry of the users. Therefore, it is difficult to use the autoresponder chat application as a system that seamlessly uses the plurality of the network services.

In addition, the system described above in Japanese Patent No. 6440571 can work together with the data input and data output of the plurality of the network services. However, the system is not designed with a simple user interface. Therefore, the system is required to be further improved from the viewpoint of improving the operability of the user.

The present invention has been made in order to solve the above-mentioned problem, and has an object to provide an interactive input support system and the like that is able to seamless use of the plurality of the network services through a simple user interface, and that is able to improve the operability and convenience of users.

Solution to Problem

The interactive input support system according to a first aspect of the present invention that works together with each of server systems, and that supports command input in interacting when a user enters a command into at least one of the server systems in order to allow the user to enjoy a given service, the each of the server systems providing a different network service from at least one of the network service of the other server system, the interactive input support system including:

a recognition device that recognizes an input text entered by the user;

a management device that manages a storage having scenario data and user information, the scenario data being data generated by converting a scenario into data, the scenario being used for enjoying each of the services based on the input text, the user information being information related to the user, being information that is requested from the server system when the user enjoys the service, and being stored in association with the each of the scenario data;

an identifying device that identifies the user who enters the input text as a specific user;

a selector that selects the scenario data and the server system based on at least one of a selected timing and a recognized input text, when it is determined that the selected timing comes to select the scenario data, the selected timing being timing when selecting at least one of the scenario data and the server system;

a generator that generates the command based on the selected scenario data, the command being a command that is outputted into the selected server system when providing the corresponding service to the identified user; and the generator that performs a guiding control process guiding the user for entering the input text based on the selected scenario data, and that generates the command being output to the selected server system based on the input text entered and recognized by the guiding control process and the user information of the identified user.

The interactive input support method according to a second aspect of the present invention that works together with each of server systems, and that supports command input in interacting when a user enters a command into at least one of the server systems in order to allow the user to enjoy a given service, the each of the server systems providing a different network service from at least one of the network service of the other server system, the interactive input support method including:

recognizing an input text entered by the user;

managing a storage having scenario data and user information, the scenario data being data generated by converting a scenario into data, the scenario being used for enjoying each of the services based on the input text, the user information being information related to the user, being information that is requested from the server system when the user enjoys the service, and being stored in association with the each of the scenario data;

identifying the user who enters the input text as a specific user;

selecting the scenario data and the server system based on at least one of a selected timing and a recognized input text, when it is determined that the selected timing comes to select the scenario data, the selected timing being timing when selecting at least one of the scenario data and the server system;

generating the command based on the selected scenario data, the command being a command that is outputted into the selected server system when providing the corresponding service to the identified user; and performing a guiding control process guiding the user for entering the input text based on the selected scenario data, and that generates the command being output to the selected server system based on the input text entered and recognized by the guiding control process and the user information of the identified user.

DETAILED DESCRIPTION OF THE EMBODIMENT (1) According to an embodiment of the invention, provided is the interactive input support system that works together with each of server systems, and that supports command input in interacting when a user enters a command into at least one of the server systems in order to allow the user to enjoy a given service, the each of the server systems providing a different network service from at least one of the network service of the other server system, the interactive input support system including:
  a recognition device that recognizes an input text entered by the user;
  a management device that manages a storage having scenario data and user information, the scenario data being data generated by converting a scenario into data, the scenario being used for enjoying each of the services based on the input text, the user information being information related to the user, being information that is requested from the server system when the user enjoys the service, and being stored in association with the each of the scenario data;
  an identifying device that identifies the user who enters the input text as a specific user;
  a selector that selects the scenario data and the server system based on at least one of a selected timing and a recognized input text, when it is determined that the selected timing comes to select the scenario data, the selected timing being timing when selecting at least one of the scenario data and the server system;
  a command generation processor that generates the command based on the selected scenario data, the command being a command that is outputted into the selected server system when providing the corresponding service to the identified user;
  a command output controller that outputs the generated command to the selected sever system; and
  the command generation processor that performs a guiding control process guiding the user for entering the input text based on the selected scenario data, and that generates the command being output to the selected server system based on the input text entered and recognized by the guiding control process and the user information of the identified user.

Based on the above configuration, the one embodiment of the present invention can allow the user to enjoy various services by the user only entering the text guided in response to the scenario. Therefore, the one embodiment can allow the user to enjoy various services without complicated user operations such as logging in for each service or entering various commands for each service, and also allows the users to use the plurality of different services seamlessly.

Further, the one embodiment of the present invention can not only collect the information necessary to output a command from the user, but also collect the information necessary to output the command from a server system while querying the sever system, by preparing the scenario. Also, the one embodiment of the present invention can output a plurality of commands including the commands to output to the server systems that provide different services, respectively. Therefore, the user can enjoy various services with a simple operation by entering input text according to the scenario.

Specifically, the one embodiment of the present invention can integrate various operations related to the various services that require complicated operations while managing each service, such as login to each service, an e-mail service, a contact management service, an attendance management service, a schedule management service, an online storage service, an information sharing (groupware) service, a customer relationship management service, a business card management service, an application management service, an accounting service, a human resource management service, a conference room reservation service, and a video conferencing (videoconferencing) service.

Accordingly, the one embodiment of the present invention can work with the plurality of the network services seamlessly by simply user interface, and can improve operability and convenience of the user.

The "input text" is not particularly limited as long as it is input that can be converted into text such as character input or voice input.

For example, the term, "analyzing a given input text" may be an analysis based on machine learning such as a morphological analysis, a Kana-Kanji conversion, a proofreading support, a dependency parsing, a key phrase extraction, and a natural language understanding.

For example, the "user" means an user who receives predetermined information using the system of the present invention. The predetermined information is information that the user desires to obtain.

For example, the "given services" indicates a services provided by a cloud computing software (network computing software) that is designed so that the functions required by the user can be used as a service as much as the user needs.

For example, the "given service" includes provision of content such as music, video, games, or descriptions of products and services, online shopping, an e-mail service, a contact management service, an attendance management service, a schedule management service, an online storage service, an information sharing (groupware) service, a customer relationship management service, a business card management service, an application management service, an accounting service, a human resource management service, a conference room reservation service, and a video conferencing (videoconference) service.

The term, "scenario" has a plurality of scripts to provide the service desired by the user, and defines the content and order of each scrips, as well as a type of data required to execute the scripts and content of the data.

For example, the term, "converting into data," means a program executed at a predetermined timing.

For example, the term, "user information" includes a login ID, a password for login, a user name, a group ID and a group name to which the user belongs, and a user attributes (age, age group, gender, location and country). The login ID, the password and the like may be common to a plurality of services, and may be different for each services. For example, the login ID, the password and the like may be stored in association with the scenario data.

For example, the term, "the user information being information related to the user, being information that is requested from the server system when the user enjoys the service, and being stored in association with the each of the scenario data," means that the user information is stored in association with the each of the scenario data, respectively, or that a single of the user information is stored as common data available in two or more scenario data.

The term, "guiding the user for entering the input text," means guiding the user for entering the text not only by the touch input of the user, but also by voice input and the like.

The term, "selecting the scenario data and the server system" means that the scenario data is selected from among a plurality of scenarios and the server is selected from among a plurality of servers, that only the scenario data is selected from among the plurality of scenarios, and that only the server is selected from among the plurality of servers. The term, "selecting" means whether or not the scenario data is used, whether or not the sever system is used, and whether or not the scenario and the sever system are used.

(2) Further, in the one embodiment of the present invention, the command generation processor may perform the guiding control process guiding the user for entering information used when the user enjoys the service provided by the generated command, as command related information, and the command output controller may output the command related information with the generated command or separately from the generated command to the selected server system, the command related information being input text entered and recognized by the guiding control process.

When further having the above configuration, the one embodiment of the present invention can generate and output the command with recognizing the information required to generate the command and the information to identify the command. Further, the one embodiment can instruct a complex command or a command that generated based on a lot of information to the server system by simple operability.

Accordingly, the one embodiment of the present invention can work with the plurality of the network services seamlessly by simply user interface, and can improve operability and convenience of the user.

For example, the term, "command related information" includes conditions of use for using the service such as date, time and location, the purpose of use of the user enjoying the service, and supplementary information for enjoying the service.

(3) Further, in the one embodiment of the present invention, the command generation processor may perform the guiding control process guiding the user for entering the command related information specified by the request instruction, as the input text, when receiving a request instruction from the server system, the request instruction requesting the command related information to be provided to the server system.

When further having the above configuration, the one embodiment of the present invention can always guide the input of command related information requested from the server system, even when information, which includes the reserving information of conference rooms, a schedule of meeting with the other user and the like, is changed as appropriate. Therefore, the user can enjoy the service based on the appropriate information and the latest information.

(4) Further, in the one embodiment of the present invention, the command generation processor may: perform the guiding control process guiding the user for entering a plurality of information used when the user enjoys the service provided by the generated command, as command related information; and generate the command based on the plurality of command related information that is entered and recognized.

When further having the above configuration, the one embodiment of the present invention can generate a complex command by selecting from a plurality of options, for example.

(5) Further, in the one embodiment of the present invention, the command generation processor may generate a plurality of command based on the input text that is entered and recognized.

When further having the above configuration, the one embodiment of the present invention can seamlessly provide the various services and work together with the various services. Therefore, the one embodiment can improve operability and convenience of the user.

(6) Further, in the one embodiment of the present invention, the scenario data may include at least one of scenario data for managing user related data indicating data related to the user and scenario data for managing data of user related event indicating an event related to the user.

When further having the above configuration, the one embodiment of the present invention can enjoy services related to user related data such as an online storage service, an e-mail service, and a contact management services, or to user related event such as a video conferencing (videoconferencing) service and a conference room reservation service.

The term, the "user related data indicating data related to the user" includes data related to the user information, such as the user's schedule and the contact information of other users managed by the user, as well as a data related to the user, such as data stored in a storage in which the user access and data of accounting and personnel and labor management.

The term, the "user related event" includes a user's own event, such as a schedule of the user and a project of the user, as well as an event related to the user, such as an event in which the user participates or is involved, and an event of an organization or a group to which the user belongs.

(7) According to an embodiment of the invention, provided is the interactive input support method that works together with each of server systems, and that supports command input in interacting when a user enters a command into at least one of the server systems in order to allow the user to enjoy a given service, the each of the server systems providing a different network service from at least one of the network service of the other server system, the interactive input support method including:

recognizing an input text entered by the user;

managing a storage having scenario data and user information, the scenario data being data generated by converting a scenario into data, the scenario being used for enjoying each of the services based on the input text, the user information being information related to the user, being information that is requested from the server system when the user enjoys the service, and being stored in association with the each of the scenario data;

identifying the user who enters the input text as a specific user;

selecting the scenario data and the server system based on at least one of a selected timing and a recognized input text, when it is determined that the selected timing comes to select the scenario data, the selected timing being timing when selecting at least one of the scenario data and the server system;

generating the command based on the selected scenario data, the command being a command that is outputted into the selected server system when providing the corresponding service to the identified user; and performing a guiding control process guiding the user for entering the input text based on the selected scenario data, and that generates the command being output to the selected server system based on the input text entered and recognized by the guiding control process and the user information of the identified user.

Further, the one embodiment of the present invention can not only collect the information necessary to output a command from the user, but also collect the information necessary to output the command from a server system while querying the sever system, by preparing the scenario. Also, the one embodiment of the present invention can output a plurality of commands including the commands to output to the server systems, respectively. Therefore, the user can enjoy various services with a simple operation by entering input text according to the scenario.

Accordingly, the one embodiment of the present invention can work with the plurality of the network services seamlessly by simply user interface, and can improve operability and convenience of the user.

Hereinafter, embodiments of the present invention will be described with reference to the drawings. It should be noted that the following embodiments are embodiments wherein interactive service providing systems and the like according to the present invention, are applied to an information processing system that automatically responses to an inquiry of a user by performing an interactive mode with a chatbot.

[1] Outline of the Information Processing System

First, the outline and configuration of the information processing system 1 in the present embodiment will be described with reference FIG. 1.

Figure 1:
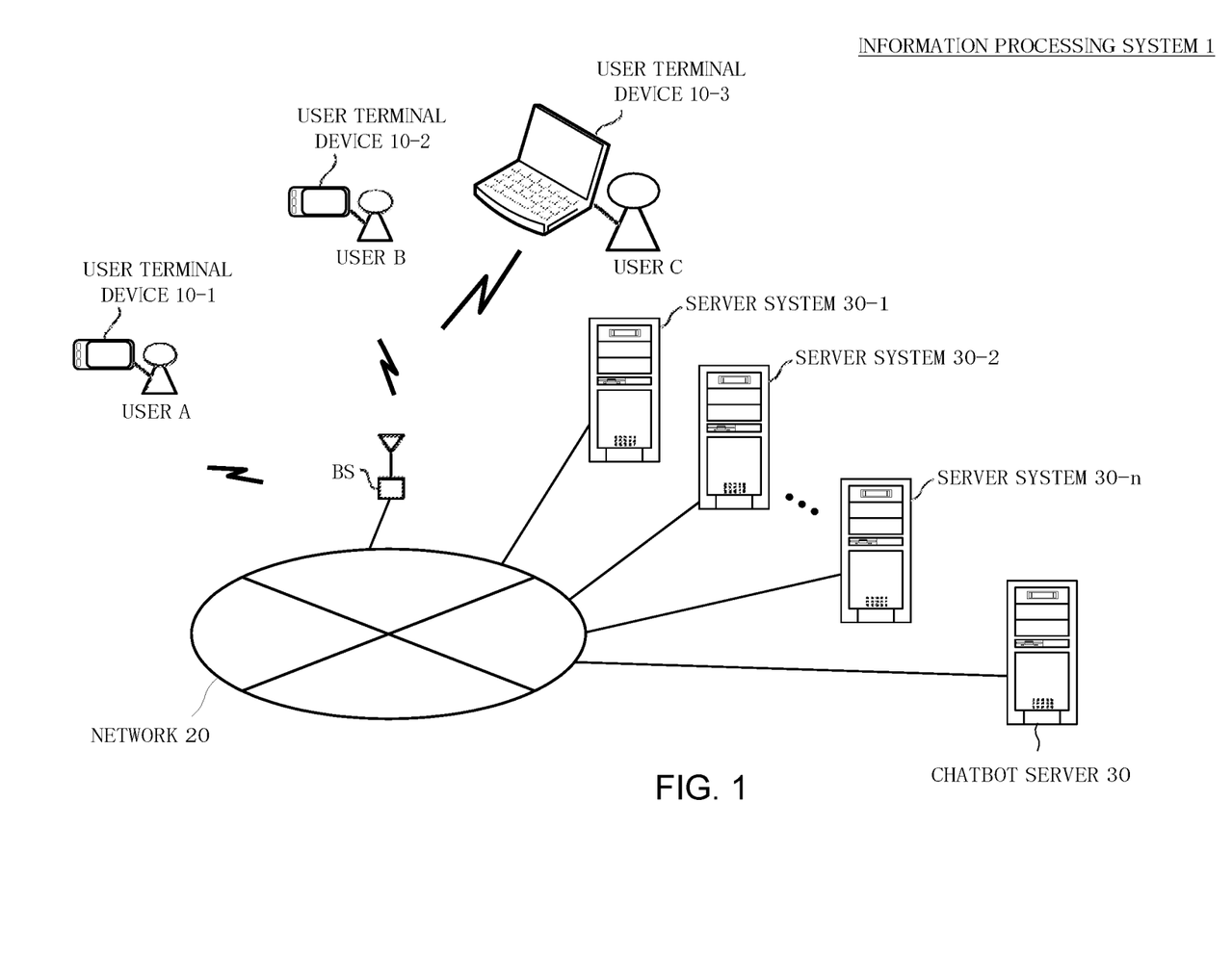
FIG. 1 is a system configuration diagram illustrating an information system configuration according to one embodiment of the present invention.

FIG. 1 is a system configuration diagram illustrating an embodiment of an information system configuration.

In order to prevent the drawings from becoming complicated, only some users, and only communication terminal devices and sever systems are shown in FIG. 1. In other words, more users, and communication terminal devices, and the like are than shown in FIG. 1.

The information processing system 1 of this embodiment is a system for providing a service that uses chatbots to answer inquiries from users based on interactive scenarios (hereinafter referred to as a "chatbot service"). For example, it is a system that is designed so that the functions of each of network services (called SaaS) required by the user can be used as much as the user needs, and so that the user (who receive information the user wishes to obtain using the system) seamlessly enjoys the different network services (including single-system and multi-tenant system), such as an email service and an online storage service.

In other words, the information processing system 1 of this embodiment is a system (hereinafter, referred to as a "chatbot system") using a chatbot to use the various network services and to allow the users to seamlessly enjoy each of services.

The information processing system 1 of this embodiment can allow the user to enjoy the each of the network services based on a software that is provided on a cloud computing (network computing) and that makes is possible to use the necessary functions as much as necessary, via the network.

For example, the information processing system 1 provides the user the each of the services while engaging the other services, such as a contact management service, an attendance management service, a schedule management service, an online storage service, an information sharing (groupware) service, a customer relationship management service, a business card management service, an application management service, an accounting service, a human resource management service, a conference room reservation service, and a video conferencing (videoconferencing) service.

For example, the information processing system 1 provides the information desired by the user (who is a user using the information processing system 1), such as contents including inquires of predetermined product and service, as well as provides a content including image and sound, and an online shopping service for providing information of the product and the services and for dealing the product and the services.

Furthermore, for example, the information processing system 1 performs various process for enjoying the each services, such as: reserving and confirming a conference room; registering and editing a report including a daily report; registering and confirming a user's schedule; retrieving and registering data being desired by a user; receiving, sending and generating emails; and uploading information to a bulletin board and browsing information of the bulletin board.

Specifically, the information processing system 1 has a scenario that is prepared in advance, and performs an interactive mode based on the scenario. As the interactive mode, the information processing system 1 provides responses to inputs and output items, such as inquiries, questions, or search requests from the user, as well as: resisters, retrieves (brows), deletes information for enjoying the services; performs various settings for enjoying the services, performs various supports for enjoying the services.

Further, the information processing system 1 of this embodiment has: a user' terminal device 10 that is used by the user; and a chatbot server 30 that seamlessly provides the user the each of the services wile working together with a server systems 50 that provides each of the services with a chatbot.

The user terminal device 10, the chatbot server 30, and the server system 50 are communicated each other via the network 20

The user terminal device 10 is a communication terminal device used by users such as a PC (personal computer), a tablet-type information communication terminal device, a smart phone, and a mobile phone.

Specifically, the user terminal device 10 has: an operation unit, such as a keyboard, a mouse, and a numeric keypad, and a display unit having a display element such as a liquid crystal panel and an organic EL (Electro Luminescence) panel.

The user terminal device 10 has a CPU that executes a predetermined application, and is configured to execute data communication with the chatbot server 30, to enjoy the service desired by the user.

Further, the user terminal device 10 transmits the input text as text data to the chatbot server 30 when the text is entered by the user, or performs a given voice analysis or an image analysis in order to convert the voice data or image data into text data and transmits the converted text data to the chatbot providing server 30.

The chatbot server 30 is a computer system having various databases (hereinafter referred to as "DB"). The chatbot server 30 work together with the server systems 50 that provide different services to users on a network 20, to support the users in enjoying various services. services.

When working together with the server systems 50 that provide the different services to the user, the chatbot server 30 supports command input in interacting entered to the server systems 50, in order to allow the user to enjoy the given services.

In order to allow the user to enjoy each of the services that are provided to the user, the chatbot server 30 analyzes a given text entered by a user (hereinafter referred to as "input text"). Further, the chatbot server 30 transmits the command to the each of the server systems 50 with a scenario that has function of a chatbot and that has the response corresponding to the input text.

Specifically, the chatbot server 30 manages scenario data and user information. The scenario data is data generated by converting a scenario into data and the scenario is for enjoying each of the services based on the input text. The user information is information related to the user, is information that is requested from the server system when the user enjoys the service, and is stored in association with the each of the scenario data.

The chatbot server 30 performs:
(A1) a text recognition process to recognize the input text entered by a user;
(A2) a user identification process to identify the user who enters the text as a specific user;
(A3) a selection process to select the scenario data from among a plurality of scenario data and to select the server system from a plurality of server systems, based on at least one of selected timing and a recognized input text, when it is determined that the selected timing comes to select the scenario data;
(A4) a command generation process to generate a command to be instructed based on the selected scenario data when providing the relevant service to the specific user; and
(A5) a command output control process to output the generated command to the selected server system.

Specifically, in the selection process of (A3), the chatbot server 30 of this embodiment selects the scenario data, such as:
(B1) the scenario data that has a scenario (hereinafter, referred to as a "scenario for user related data") for managing user related data including schedule data of the user, business card data of the user, management data of the user data, for example;
(B2) the scenario data that has a scenario (hereinafter, referred to as a "scenario for managing an event") for managing user related event indicating an event related to the user and including a meeting with a client, a conference room reservation, and attendance management; or
(B3) the scenario data having the scenario for user related data and the scenario for managing the event.

Further, in the command generation process of (A4), the chatbot server 30 performs a guiding control process that guides the user for entering the input text based on the selected scenario data, and that generates the command being output to the selected server system based on the input text entered and recognized by the guiding control process and the user information of the identified user.

Based on the above configuration, the information processing system 1 in the present embodiment can allow the user to enjoy various services by the user only entering the text guided in response to the scenario. Therefore, the information processing system 1 can allow the user to enjoy various services without complicated user operations such as logging in for each service or entering various commands for each service, and also allows the users to use the plurality of different services seamlessly.

In other words, the information processing system 1 in the present embodiment can not only collect the information necessary to output a command from the user, but also collect the information necessary to output the command from a server system while querying the sever system, by preparing the scenario. Also, the information processing system 1 can output a plurality of commands including the commands to output to the server systems that provide different services, respectively. Therefore, the user can enjoy various services with a simple operation by entering input text according to the scenario.

Accordingly, the information processing system 1 in the present embodiment can work with the plurality of the network services seamlessly by simply user interface, and can improve operability and convenience of the user.

[2] Chatbot Server

[2.1] Configuration

Figure 2:
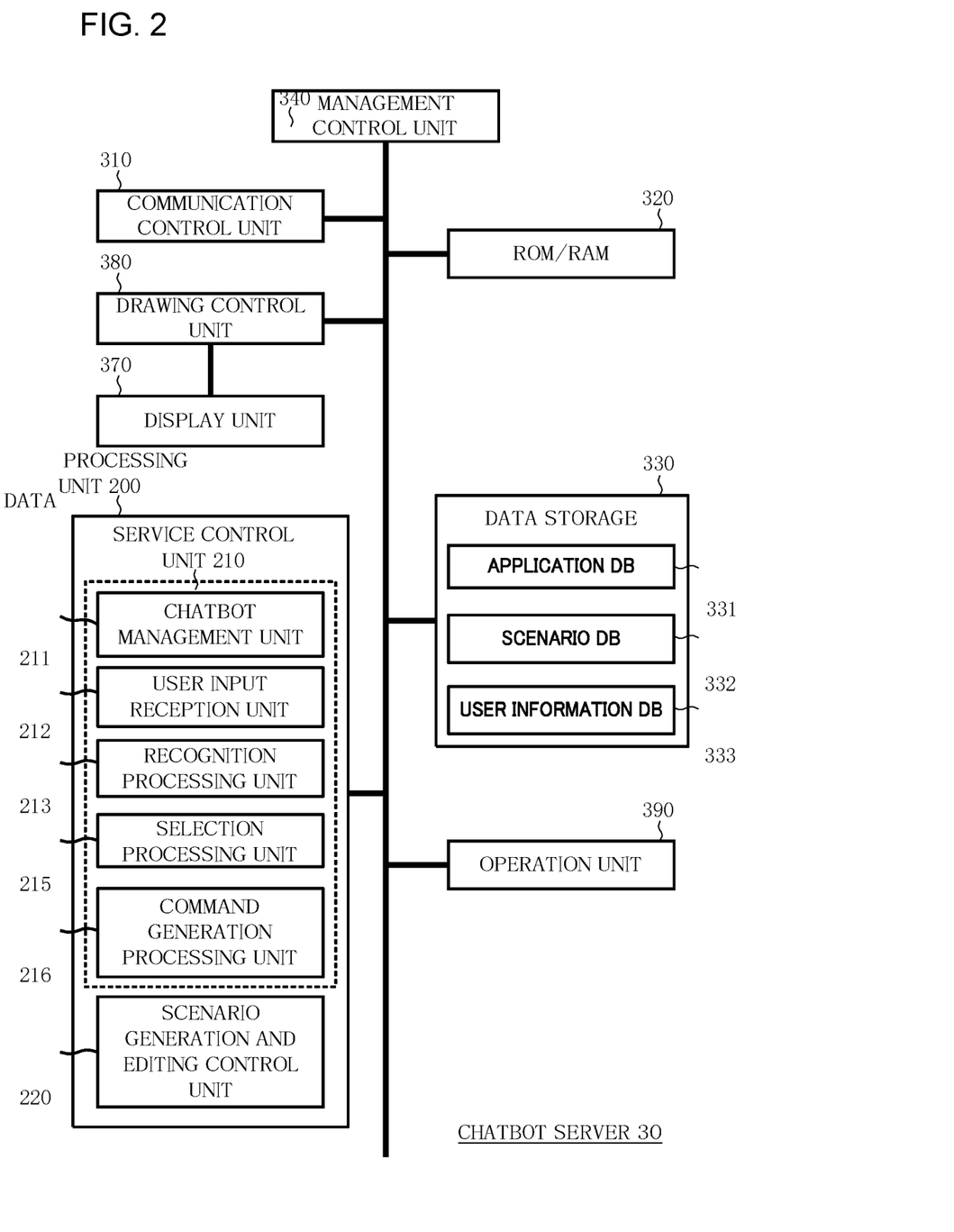
FIG. 2 is a diagram illustrating functional blocks of a chatbot server of the embodiment of the present invention.
Figure 3:
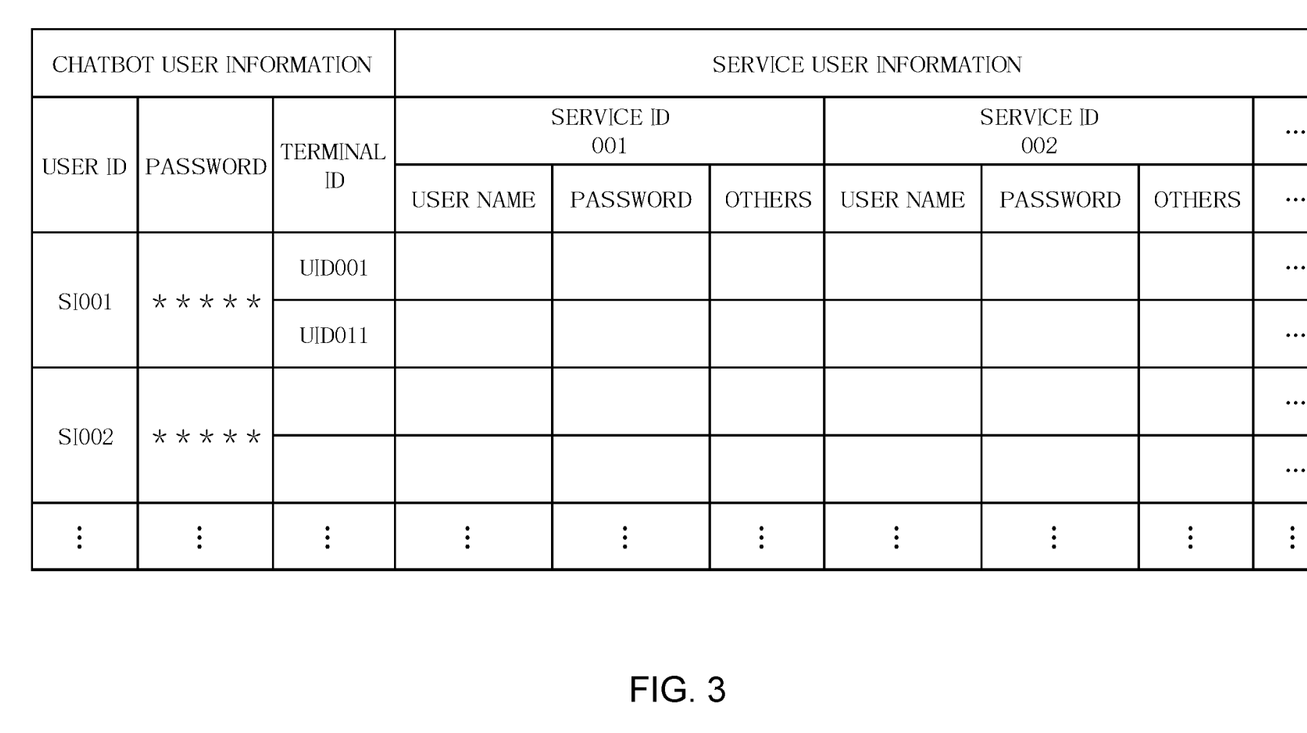
FIG. 3 shows an example of the data stored in the user information database in the embodiment of the present invention.

Next, the configuration of the chatbot server 30 of the present embodiment will be described with reference to FIGS. 2 and 3. FIG. 2 is a diagram illustrating functional blocks of a chatbot server 30 of the present embodiment. FIG. 3 shows an example of the data stored in the user information DB 333 in the present embodiment.

The communication control unit 310 is a predetermined network interface and builds communication channels with terminal devices 10 for each user, and transmits the various data to each of the user terminal devices 10 and receives the various data from the user terminal devices 10.

In the ROM/RAM 320, various programs necessary for operating the chatbot 30. Also, the ROM/RAM 320 is used as a work area when various processes are executed.

The data base 330 is configured by an HDD or SSD (Solid State Drive).

The data base 330 has the application DB 331 in which various applications are stored, and the scenario DB 332 in which scenario data generated by user and each scenario component data defining the basic script used when generating the scenario data, are stored.

In the application DB 331, at least an applications that includes a service operation application and a scenario generation and editing application, and various data are stored. The service operation application is an application that provides various services using a scenario that have been set in advance and a chatbot, based on the user input. The scenario generation and editing application that an application that generates the scenario for enjoying services using the chatbot. The various data is used in executing the applications.

In the scenario DB 332, two or more scenario data is stored in association with IDs to identify each scenario data (hereinafter referred to as "scenario IDs"). The scenario data is set by a supervisor, and is data generated by converting the scenario into data. The scenario is defined to allow the user to enjoy the each of the services.

The scenario data is a data set by the supervisor, has a plurality of scripts to provide the service desired by a user, and defines the content and order of each scrips, as well as a type of data required to execute the scripts and content of the data, in order to provide the service using the chatbot.

For example, the scenario data is generated by converting the scenario into data defined as a program (algorithm) executed in a predetermined timing. The scenario data has a data structure capable of providing the various services while working together with the appropriate server system 50.

The "scenario" has a plurality of scripts to provide the service desired by a user, and defines the content and order of each scrips, as well as a type of data required to execute the scripts and content of the data.

In the user information DB 333, the user information is stored. The user information is information related to the user, is requested from the server system 50 when the user enjoys the service, and is stored in association with the each of the scenario data.

For example, in the user information DB 333, as shown in FIG. 3, user information for the chatbot, user information for the services and the other information related to the user. The user information for the chatbot including: a login ID for logging on to the information processing system 1 with a chatbot 1 (for example, logging on to the chatbot service that manages each service) ID (hereinafter referred to as "chatbot user ID"); a password for the login (hereinafter referred to as "chatbot password"); and an ID of the user terminal device 10 (hereinafter referred to as the "terminal ID"). The user information for the services is required for each of the services corresponding to the scenario ID, respectively.

Specifically, as shown in FIG. 3, the user information for the services includes, for each of login IDs for logging on to the each of the services (hereinafter referred to as "service ID"), a password for login, a user name (hereinafter referred to as a "user name for service), a group ID and a group name to which the user belongs, and a user attributes (age, age group, gender, location and country).

The login ID for the service, the password and the like may be common to a plurality of services, and may be different for each services. For example, the login ID for the service, the password and the like may be stored in association with the scenario data. In other words, the login ID for the service, the password and the like may be stored in association with the each of the scenario data. Alternatively, the login ID for the service, the password and the like may be stored as common data available in two or more scenario data.

The management control unit 340 has a central processing unit (CPU), mainly, and performs integrated control of each part of the chatbot server 30 by executing a program.

The data process unit 200 is configured with the same central processing unit (CPU) as the management control unit 340 or with a different central processing unit (CPU) from the management control unit 340, and executes various processes by applications.

Specifically, data process unit 200 includes: the service control unit 210 that executes the service provision process for providing services using the chatbot based on a scenario set by an administrator; and a scenario generation and editing unit 220 that performs the scenario generation and editing process for generating a new scenario or editing an already generated scenario based on instructions from the administrator.

The details and performances of the service control unit 210 of the present information will be described later.

The scenario generation and editing control unit 220 generates and edits the scenario data based on the instructions of the supervisor.

The display 370 is configured by a CRT, LCD, touch panel type display, or HMD (head mounted display) and so on, and displays a given image.

The drawing control unit 380 generates images for displaying the object space including the arranged scenario component data and the results of the determination process on the display 370.

The operation unit 390 is used for entering operation data by the supervisor, and is configured by a touch panel or a touch panel type display.

Specifically, the operation unit 390 has a detection unit (touch panel) that is capable of detecting two-dimensional instruction position coordinates (x, y) on a screen on which images are displayed on the display unit 370, and detects contact operations on the touch panel using an input device such as a touch pen, or a fingertip.

Further, the operation unit 390 may have buttons, levers, a keyboard, a microphone, an acceleration sensor, a mouse, a track pad, or an input device using line of sight (eye input device), etc. that can input operation information (operation signals) other than the indicated position.

[2.2] Service Providing Process

Next, the details of the service providing process executed by the service control unit 210 of this embodiment will be described.

In order to execute the service providing process, by executing a service operation application, the service control unit 210 has: a chatbot management unit 211 that controls the entire chatbot service while managing scenario data; a user input reception unit 212 that receive data (hereinafter referred to as "input text data") such as text entered by the user at the user's terminal device 10; a recognition processing unit 213 that analyzes the input text data and performs recognition processing to recognize the instructions of the user; a selection processing unit 215 that executes a selection process to select the scenario data and the server systems 50, and a command generation processing unit 216 that generates a command to instruct the appropriate server system 50 based on the selected scenario data.

The chatbot management unit 211 registers, to the scenario DB 332, the user information that is related to the user and that is requested from the server system 50 when the user enjoys the service, in association with the each of the scenario data or the two or more scenario data, wherein the scenario data is generated by converting a scenario into data. Further, the chatbot management unit 211 edits and deletes the user information that is registered in the scenario DB 332 already.

The chatbot management unit 211 works together with the user terminal device 10, and performs user authentication when the chatbot service is accessed by the user.

The chatbot management unit 211 performs the user authentication and the like based on a scenario (hereinafter referred to as a "login scenario") that has the scenario defined to start working together with the user terminal devise 10.

The chatbot management unit 211 performs the identification process that that identifies the user who enjoys the service as a specific user.

For example, the chatbot management unit 211 identifies the specific user by searching the login Ids of each of the user stored in the user information DB 333, and by detecting the same login ID as the entered login ID from among them as an ID of the specific user (hereinafter referred to as a "specific user ID").

The user input reception unit 212 may receive text data, voice data, or image data that are entered by the user.

When receiving the text data, the user input reception unit 212 outputs the received text data to the recognition processing unit 213. When receiving the voice data, or the image data, the user input reception unit 212 converts the data to text data by performing a given voice analysis or image analysis, and outputs the converted text data to the recognition processing unit 213.

The recognition processing unit 213 performs various natural language process, such as a morphological analysis, a kana-kanji conversion, a proofreading support, a clause analysis, a key phrase extraction, and a natural language understanding process, on the input text data, i.e., the input text input by the user, and recognizes the accepted user instructions.

The selection processing unit 215 executes the selection process to select the scenario data and the server system 50.

Specifically, the selection processing unit 215 identifies the service based on a timing of the login (time) and the user ID of the user who logged in (the specified user), and selects the scenario data that performs the scenario to enjoy the service and the server system 50 that provides the service.

For example, when a user having a specific attribute such as a user having a schedule on the day of login or a user in a sales position logs in the chatbot service at opening time or within the specified time before and after the opening time, based on the specific user ID, the selection processing unit 215 selects the scenario data that performs the scenario of a schedule management service as a service to be enjoyed, and the sever system 50 that manages the schedule of the specific user.

For example, the selection processing unit 215 may identify the service that is enjoyed by the user based on a login scenario, a login timing and input text, and may select the scenario data that performs the scenario to enjoy the service and the server system 50 that provides the service.

For example, in this case, the selection processing unit 215 identifies the service that is enjoyed by the user based on the recognized input text entered by the user when the chatbot management unit 211 performs guiding to enter the input text by the user based on the login scenario, and select the scenario data that has the scenario to enjoy the service and the server system 50 that provides the service.

The selection processing unit 215 may identify the service that the specific user enjoys based on the terminal ID of the user terminal device 10 of the specific user who has logged in, in addition to the login timing and the specific user ID.

For example, when identifying a specific user who has a meeting with a new client on that day and a timing after a login timing based on the specific user ID and the login timing and when the terminal ID transmitted from the user terminal device that accesses in the chatbot service is a terminal ID of the portable information terminal device, the selection processing unit 215 select the scenario data that has the scenario to enjoy the business card management service and the server system 50 that provides the business card management service.

The selection processing unit 215 may identify the service that is enjoyed by the user based on a login scenario and one or two of the specific user ID, the login timing and terminal ID. Further, the selection processing unit 215 may select the scenario data that has the scenario to enjoy the service and the server system 50 that provides the service.

The command generation processing unit 216 performs the command generation process that generates a command to instruct the appropriate server system 50 that provides the service to the specific user based on the selected scenario data. The command generation processing unit 216 executes a process to allow the specific user to enjoy the service specified by working together with the selected server system 50.

Further, when performing the command generation process, the command generation processing unit 216 performs the guiding control process that guides the user for entering the input text based on the selected scenario data, and that generates the command being output to the selected server system based on the input text entered and recognized by the guiding control process and the user information of the identified user.

The command generation processing unit 216 performs a command output control process to output, to the selected server system 50, the command generated based the selected scenario data and the specific user information.

The details of the command generation process including the guidance control process and the output control process in the command generation processing unit 216 of this embodiment will be described later.

Figure 4:
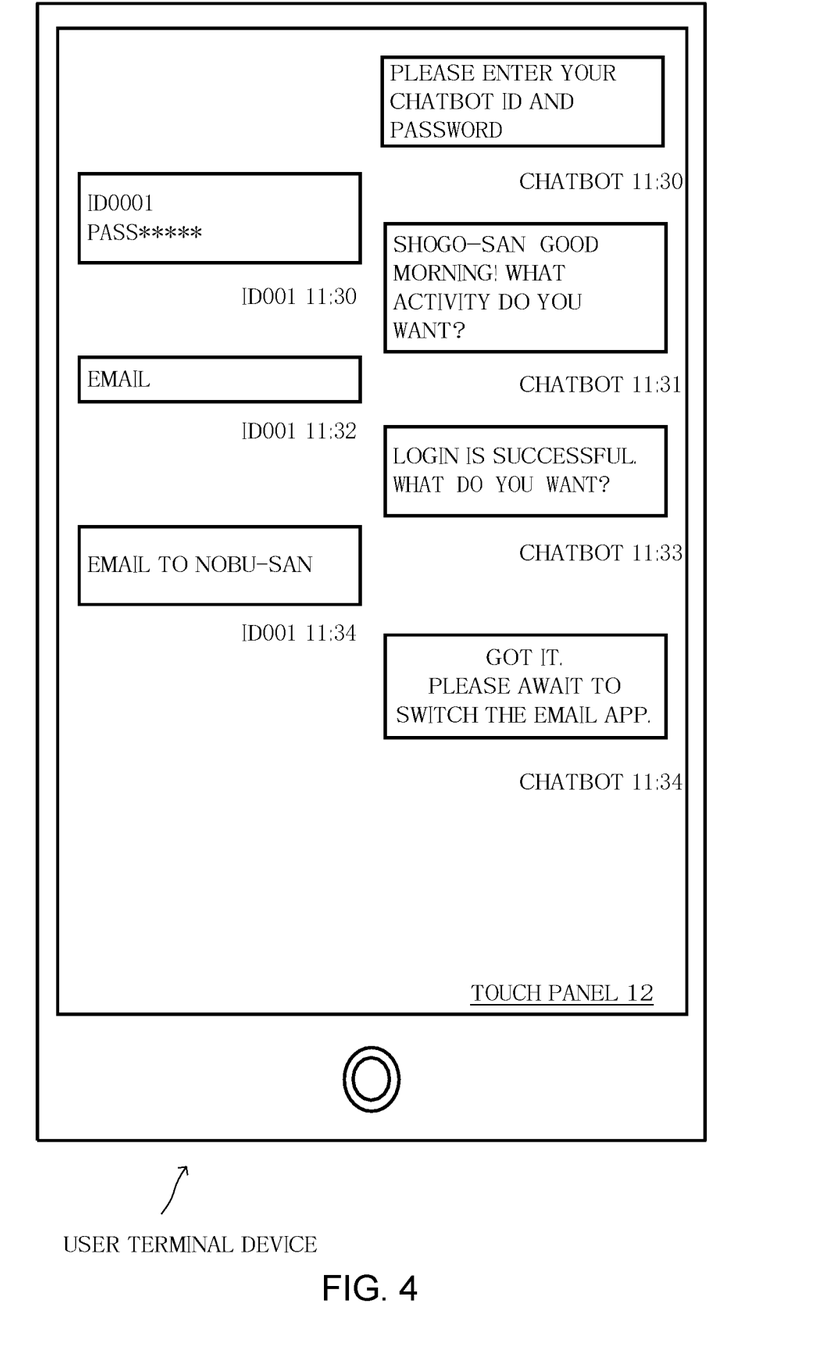
FIG. 4 is a diagram for explaining the command generation process including the guiding control process of the embodiment of the present invention.
Figure 5:
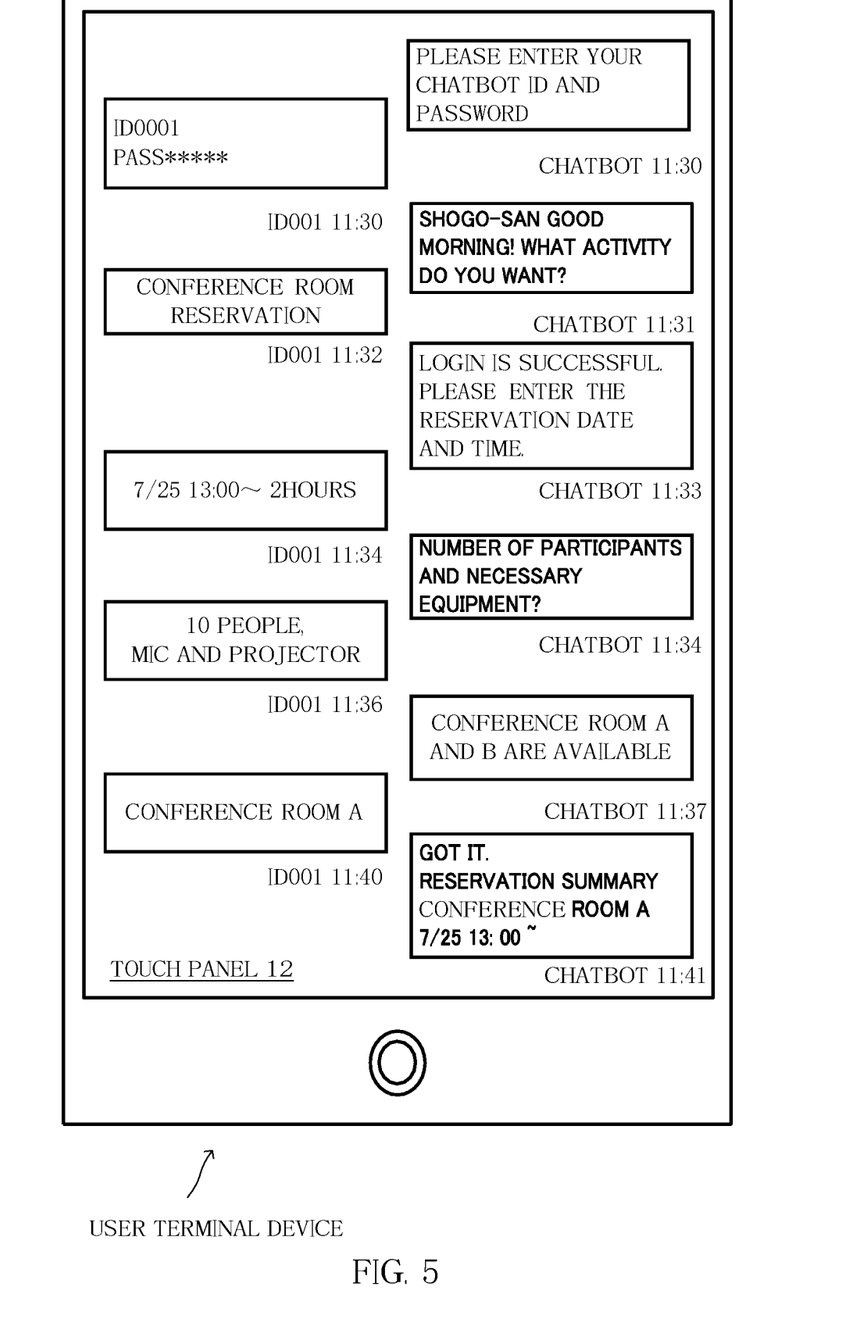
FIG. 5 is a diagram for explaining the command generation process including the guiding control process of the embodiment of the present invention.

[2.3] Command Generation Process Including Guidance Control Process and Output Control Process Next, the details of the command generation process including the guidance control process and the output control process in the command generation processing unit 216 of this embodiment will be described with FIGS. 4 and 5. FIGS. 4 and 5 are diagrams for explaining the command generation process including the guiding control process of the embodiment of the present invention.

The command generation processing unit 216 performs the guiding control process that guides the user for entering the input text based on the scenario data selected by the selection processing unit 215, and that generates the command being output to the selected server system based on the input text entered and recognized by the guiding control process and the user information of the identified user.

Specifically, the command generation processing unit 216 searches the user information DB 333 based on the specific user ID, identifies the specific user information such as a login ID and login password, and output the identified user information to the selected server system 50.

Further, the command generation processing unit 216 performs the guiding control process that guides the user (the user terminal device 10) for entering the input text related to the generated command. The command generation processing unit 216 generates a command to enjoy the identified service such as checking emails, registering a schedule, or reserving a conference room, and outputs the generated command to the selected server system 50.

For example, when selecting the email service by the selection process, the command generation processing unit 216 identifies the user information used for performing login authentication of the email service, and outputs the specified user information to the server system 50 that provides the email service.

Further, as shown FIG. 4, the command generation processing unit 216 performs the guiding control process that guides the user for entering an address information that is an address to send an email (email address or a nickname associated with the email address). The command generation processing unit 216 generates and outputs a command for sending the email to the nickname entered by the guiding control process.

FIG. 4 is an example of the image displayed on the user terminal device. FIG. 4 shows running the application for email to generate the command for sending email to the address, "Nobu-san" and to work together with the server system 50 when logging in the chatbot service based on the chatbot ID and password, and when the guiding control process identifies the email service and recognizes sending the email to the email address, "Nobu-san."

The command for sending an email to a nickname is a command to set the email address associated with the nickname as a delivery address, and to display, on the web browser of the user terminal device 10, the content of the email (the body part of the email data) ready for text input.

Based on the scenario data with the specific command, the command generation processing unit 216 may perform the guiding process that guides the user to enter the information used when the user enjoys the service, such as usage conditions including date, time and location for using the service, and the purpose of use and supplementary information for enjoying the service.

Further, in this case, the command generation processing unit 216 may output, to the selected server system 50, the command related information indicating the input text entered and recognized by the guidance control process together with the generated command or separately from the generated command.

Further, the command generation processing unit 216 may perform the guiding control process guiding the user for entering the command related information specified by a request instruction, as the input text, when receiving the request instruction that is an instruction for requesting the command related information to be provided to the server system 50, and that transmits the command related information from the server system 50.

As the guidance control processing, the command generation processing unit 216 may guide the user for entering one or more command related information, and generate the command based on the entered and recognized command related information.

For example, as shown FIG. 5, when selecting the conference room reservation service by the selection process, the command generation processing unit 216 identifies the user information used for performing login authentication of the conference room reservation service, and outputs the specified user information to the server system 50 that provides the conference room reservation service.

Further, as shown FIG. 5, the command generation processing unit 216 generates and outputs the command for reserving the conference room, and performs the guiding control process that guides the user, by the input text, for entering the command related information such as the date and time of the reservation of the conference, the number of people participating in the conference, participant information, and the necessary equipment information. The command generation processing unit 216 outputs, to the server system 50 that provide the conference room reservation service, the command related information obtained by the guiding control process.

FIG. 5 is an example of the image displayed on the user terminal device. FIG. 5 shows running the application (API) for the conference room reservation service to generate the command for reserving the conference room of the A and to work together with the server system 50 when logging in the chatbot service based on the chatbot ID and a password (a pass), when the guiding control process identifies the conference room reservation service and recognizes the request conditions, "microphone and a projector as the necessary equipment, 10 participants, from 13:00 to 2 hours, July 25," and when proposing both "A and B conference rooms" that match each condition.

In this case, based on the output command related information, when not proposing any conference room, and when receiving a revised request instruction transmitted from the server system 50 such as the request date, the command generation processing unit 216 performs the guiding control processing to enter the command related information by the input text such as alternative reservation date and time while notifying that the reservation is not possible, and outputs again, to the server system 50 that provide the conference room reservation service, the command related information obtained by the guiding control process.

The command generation processing unit 216 performs the guiding control processing, repeatedly, until outputting the command related information indicated that the reservation is not possible, and lastly outputs the command indicated that the reservation is possible.

The command generation processing unit 216 may generate a plurality of command based on the input text that is entered and recognized.

For example, when providing the above the conference room reservation service, the command generation processing unit 216 may perform the guiding control processing and the output control service to reserve the other reservation of the different conference room, and may register schedules of the specific user and a participant who have the reservation of the conference room, while working together with the schedule management service of each of the users after finishing the reservation of the conference room.

In this case, the command generation processing unit 216 selects the server system 50 that provides the schedule management service, and outputs the command for registering the schedule of the conferenced to be held on that date and time while logging in the server system 50 based on the specific user information.

[3] Operation of Command Generation Process Including Guidance Control Process and Output Control Process Next, the details of the command generation process including the guiding control process and output control performed in the chatbot server 30 of this embodiment will be described with FIG. 6.

Figure 6:
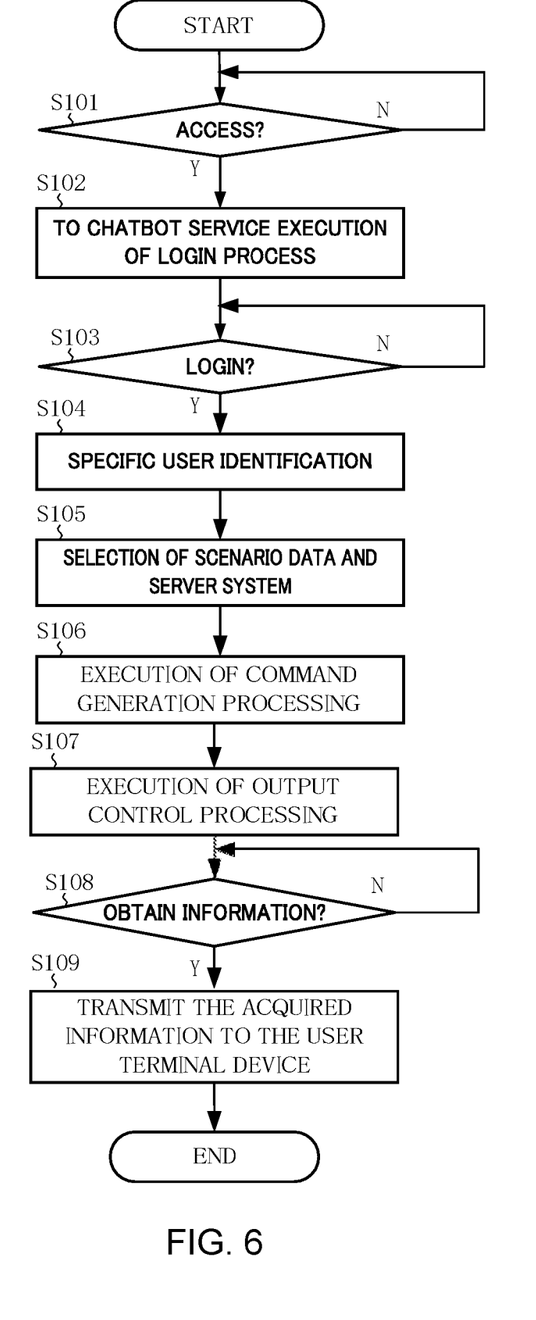
FIG. 6 is a flow chart illustrating the command generation process including the guiding control process and output control performed in the chatbot server of the embodiment of the present invention.

FIG. 6 is a flow chart illustrating the command generation process including the guiding control process and output control performed in the chatbot server 30 of this embodiment.

This operation is performed when various types of scenario data have already been stored in the scenario DB 332 and various types of user information of the user have already been stored in the user information DB 333.

First, when detecting that a user terminal device 110 has accessed the chatbot service through the communication control unit 310 (step S101), the chatbot management unit 211, based on the login scenario data, performs a login process that executes the user authentication to log in the chatbot service (Step S102).

Next, when executing the login based on the user authentication (Step S103), the chatbot management unit 211 identifies the user who accesses the chatbot service as a specific user based on the information such as a login ID when executing the login (Step S104).

Next, the selection processing unit 215 works together with the user input reception unit 212 and the recognition processing unit 21, and selects the scenario data and the server system 50 based on the user ID of the specific user and the input text that is entered and recognized (Step S105).

The command generation processing unit 216 works together with the user terminal device, and performs the command generation process that generates a command to instruct the appropriate server system 50 that provides the service to the specific user based on the selected scenario data while performing the guiding control processing that guides the user to enter command related information. (Step S106).

The command generation processing unit 216 performs a command output control processing that outputs the generated command to the selected server system 50 through the communication control unit 310 (Step S107).

Finally, when obtaining the information to enjoy the appropriate service (Step S108), command generation processing unit 216 provides the obtained information to the user terminal device 10 through the communication control unit 310 and terminates this operation (Step S109).

[4] Modifications

Next, the modifications of the present embodiment will be described.

(Modification 1)

In this embodiment, a plurality of server systems 50 providing the same service may be prepared. In this case, the server systems 50 may be used by switched for each of the user, for each of the rank of the user who enjoys the service, or each of the area to which the user belongs.

(Modification 2)

In the above embodiment, DBs is provided in the chatbot server 30, and the DBs are managed and controlled only in the chatbot server 30, but each of the DBs may be managed and controlled by a separate computer system.

(Modification 3)

In the above embodiment, the chatbot server 30 performs the command generation processing, but a server system may have a plurality of the server, and the server system performs the command generation processing.

(Modification 4)

In the above embodiment, the selection processing unit 215 selects the used scenario data from among a plurality of scenario data and selects the used server system 50 from among a plurality of server systems 50, but the selection processing unit 215 may select only the server system 50 from among the plurality of server systems 50 with a single scenario, and select the scenario data only from among the plurality of scenario data.

Further, the selection processing unit 215 may perform the selection processing by determining whether or not the scenario data is used, whether or not the sever system is used, and whether or not the scenario and the sever system are used.

REFERENCE SIGNS LIST

1 Information processing system
10 User terminal device
20 Network
30 Chatbot Server
200 Data processing unit
210 Service control unit
211 Chatbot management unit
212 User input reception unit
213 Recognition processing unit
215 Selection processing unit
216 Command generation processing unit
220 Scenario generation and editing control unit
310 Communication control unit
320 ROM/RAM
330 Data storage
331 Application DB
332 Scenario DB
333 User information DB
340 Management control unit
370 Display unit
380 Drawing control unit
390 Operation unit

What is claimed is:

1. An interactive input support system included in an information processing system that has a terminal device used by a user, a plurality of servers, and the interactive input support system supporting command input in interacting when a user enters a command into at least one of the plurality of servers in order to allow the user to use a given service, the plurality of servers each providing a different network service from at least one of the network service of the other server system, the interactive input support system comprising a processor programmed to:

receive an input text that is entered by the user and is transmitted from the terminal device, and recognize the received input text;

manage a storage having a plurality of scenario data and user information, the plurality of scenario data each being data generated based on a scenario that is used for each of the services based on a recognized input text, the user information being information related to the user, being information that is requested from at least one of the plurality of servers when the user uses the service, and being stored in association with the each of the scenario data;

identify the user who enters the input text transmitted from the terminal device as a specific user;

detect a timing when the input text is inputted, as a specific timing;

select at least one of the plurality of scenario data, and at least one of the plurality of servers among from the plurality of servers based on the specific timing, the recognized input text and a terminal device ID;

generate the command based on the selected scenario data, the command being a command that is outputted into the selected server when providing the corresponding service to the specific user;

output the generated command to the selected sever;

obtain service related information from the selected server, and provide obtained service related information to the terminal device of the specific user;

perform a guiding control process guiding the specific user for entering the input text based on the selected scenario data, and that generates the command being output to the selected server based on the input text entered and recognized by the guiding control process and the user information of the specific user.

2. The interactive input support system according to claim 1, wherein the processor is programmed to:
perform the guiding control process guiding the specific user while working together with the terminal device of the specific user for entering the input text that is command related information used when the specific user uses the service provided by the generated command; and
output the command related information with the generated command or separately from the generated command to the selected server.

3. The interactive input support system according to claim 2, wherein
The processor is programmed to perform the guiding control process guiding the specific user for entering the input text of the command related information specified by the request instruction when receiving a request instruction from the selected server, the request instruction requesting the command related information to be provided to the selected server.

4. The interactive input support system according to claim 1, wherein
the processor is programmed to: perform the guiding control process guiding the specific user for entering the input text that is a plurality of command related information used when the specific user uses the service provided by the generated command; and generate the command based on the plurality of command related information.

5. The interactive input support system according to claim 1, wherein
the processor is programmed to generate a plurality of commands based on the input text that is entered and recognized.

6. The interactive input support system according to claim 1, wherein
the scenario data includes at least one of scenario data for managing user related data indicating data related to the user and scenario data for managing data of user related event indicating an event related to the user.

7. An interactive input support method included in an information processing system that has a terminal device used by a user, a plurality of servers, and the interactive input support system supporting command input in interacting when a user enters a command into at least one of the plurality of servers in order to allow the user to use a given service, the plurality of servers each providing a different network service from at least one of the network service of the other server system, the interactive input support method comprising:
receiving an input text that is entered by the user and is transmitted from the terminal device, and recognize the received input text;
managing a storage having a plurality of scenario data and user information, the plurality of scenario data each being data generated based on a scenario that is used for each of the services based on a recognized input text, the user information being information related to the user, being information that is requested from at least one of the plurality of servers when the user uses the service, and being stored in association with the each of the scenario data;
identifying the user who enters the input text transmitted from the terminal device as a specific user;
detecting a timing when the input text is inputted, as a specific timing;
selecting at least one of the plurality of scenario data, and at least one of the plurality of servers among from the plurality of servers based on the specific timing, the recognized input text and a terminal device ID;
generating the command based on the selected scenario data, the command being a command that is outputted into the selected server when providing the corresponding service to the identified user;
outputting the generated command to the selected sever;
obtaining service related information from the selected server, and providing obtained service related information to the terminal device of the specific user; and
performing a guiding control process guiding the specific user for entering the input text based on the selected scenario data, and that generates the command being output to the selected server based on the input text entered and recognized by the guiding control process and the user information of the specific user.

8. The interactive input support system according to claim 1, wherein
the processor is programmed to output a plurality of generated commands to a plurality of selected servers that provides a different service from at least one of the service of the other server.

9. An interactive input support system that works together with a plurality of servers and supports a user to input command into at least one of the plurality of servers in interacting in order to allow a user to use a given service, the plurality of servers each providing a different network service from at least one of the network service of the other server system, the interactive input support system comprising a processor programmed to:
recognize an input text entered by the user;
manage a storage having a plurality of scenario data and user information, the plurality of scenario data each being data generated based on a scenario that is used for each of the services based on the input text, the user information being information related to the user, being information that is requested from at least one of the plurality of servers when the user uses the service, and being stored in association with the each of the scenario data;
identify the user who enters the input text as a specific user;
detect a timing when the input text is inputted, as a specific timing;
select at least one of the plurality of scenario data, and at least one of the plurality of servers that works together with the interactive input support system, among from the plurality of servers based on the specific timing the recognized input text and a terminal device ID;
generate the command based on the selected scenario data, the command being a command that is outputted into the selected server when providing the corresponding service to the specific user;
output the generated command to the selected sever; and
perform a guiding control process guiding the specific user for entering the input text based on the selected scenario data, and that generates the command being output to the selected server based on the input text entered and recognized by the guiding control process and the user information of the specific user.

10. The interactive input support system according to as claimed in claim 1, wherein
the processor is programmed to:
identify an attribute of the user based on the user information or receive the attribute with the input text; and select at least one of the plurality of scenario data, and at least one of the plurality of servers among from the plurality of servers based on the specific timing, the recognized input text, and the attribute of the user,
an input text that is entered by the user and is transmitted from the terminal device, and recognize the received input text.

\* \* \* \* \*